(12) United States Patent
Ferreira et al.

(10) Patent No.: US 7,409,860 B2
(45) Date of Patent: Aug. 12, 2008

(54) FUEL LEVEL MEASUREMENT DEVICE

(75) Inventors: David M. Ferreira, Orange, CT (US); Mark R. Johansen, Wallingford, CT (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 338 days.

(21) Appl. No.: 11/353,345

(22) Filed: Feb. 14, 2006

(65) Prior Publication Data

US 2007/0186647 A1    Aug. 16, 2007

(51) Int. Cl.
G01F 23/00    (2006.01)
G01F 23/76    (2006.01)

(52) U.S. Cl. ........................................ 73/313; 73/322.5
(58) Field of Classification Search ................... 73/313, 73/322.5
See application file for complete search history.

(56) References Cited

U.S. PATENT DOCUMENTS

| | | | | |
|---|---|---|---|---|
| 4,373,155 A | * | 2/1983 | Dola | 340/623 |
| 4,637,254 A | * | 1/1987 | Dyben et al. | 73/314 |
| 4,917,135 A | * | 4/1990 | Duncan | 137/2 |
| 5,017,748 A | * | 5/1991 | Sapiro | 200/84 C |
| 6,000,913 A | | 12/1999 | Chung et al. | |
| 6,436,287 B1 | | 8/2002 | Fischerkeller et al. | |
| 6,518,873 B1 | | 2/2003 | O'Regan et al. | |
| 6,761,193 B1 | | 7/2004 | Cotton et al. | |
| 6,828,898 B2 | | 12/2004 | Dedert et al. | |
| 7,062,966 B1 | * | 6/2006 | Davila | 73/313 |

OTHER PUBLICATIONS

Design Guidelines for Automotive Fuel Level Sensors, E. F. Smith, III and Hugh W. Ireland, SAE Technical Paper Series, 2002-01-1074.

* cited by examiner

Primary Examiner—Hezron E. Williams
Assistant Examiner—Rodney T Frank
(74) Attorney, Agent, or Firm—Reising, Ethington, Barnes, Kisselle, P.C.

(57) ABSTRACT

A fuel level measurement device has a fuel level sensor carried by a fuel level float at the distal end of a pivoting float arm of the device which is preferably part of a fuel pump module located inside of a fuel tank preferably for automotive applications. Preferably a sealed arcuate chamber of the float is defined between an electrically conductive cover and a variable electric resistor which preferably is a generally non-conductive ceramic substrate that carries an electrically resistive ink strip. A track exposed in the arcuate chamber has a concave shape that generally faces upward so that a rolling member changes position due to the forces of gravity within the chamber as the float arm pivots generally up and down with changing fuel levels in the tank. The rolling member is electrically conductive and completes the circuit between the electrically conductive cover and the variable resistive ink strip. The sealed chamber provides the pathway for the rolling member and preferably at least in part the buoyancy for the float.

17 Claims, 3 Drawing Sheets

FUEL LEVEL MEASUREMENT DEVICE

FIELD OF THE INVENTION

This invention relates generally to a fuel level measurement device, and more particularly to a buoyant fuel level sensor of the fuel level measurement device.

BACKGROUND OF THE INVENTION

FIGS. 1 and 2 illustrate a known pre-assembled fuel pump module 10 for an automotive vehicle being inserted into a liquid fuel tank 12 through an access hole 14 defined by a peripheral edge 16 of a tank wall 18 that defines an interior or fuel chamber 20. The pump module 10 has an elongated electric fuel pump 22 disposed typically in the fuel chamber 20 when assembled and a substantially cylindrical flange 24 attached to the fuel pump 22 via a pair of parallel posts of a bracket 26. When fully assembled to the tank 12, the flange 24 engages salably to the peripheral edge 16 of the fuel tank wall 18, and the pump 22 is suspended within the fuel chamber 20 from the flange 24, and bracket 26.

The known fuel pump module 10 has an elongated fuel level measurement device 28 that sends a fuel level signal, via a pair of electric wires 30, to a fuel level indicator or meter typically mounted to an instrument panel of the vehicle (not shown). The wires 30 are connected to a variable resistor 32 on a card 34 snap fitted or seated within a plastic base 36 pivotally connected to the bracket 26. The pair of wires 30 extend through the flange 24 projecting outward from the tank 12.

An elongated wiper-type arm 38 has a base end 40 bent at an approximate right angle and carried pivotally by the plastic base 36 to pivot about an arm axis. An opposite distal end 42 of the wiper arm 38, also bent at an approximate right angle, pivotally carries a buoyant or hollow plastic float 44 that pivots about a float axis that is substantially parallel to the arm axis.

The buoyant float 44 is generally planar or low-lying and rectangular or cylindrical in shape and floats on the surface of fuel contained within the tank 12. As the fuel level changes, the float 44 rises or lowers with the fuel surface causing the wiper arm 38 to pivot at the base end 40, thus wiping or sweeping electrically conductive contacts 46 across contacts 48 of the variable resistor 32 producing a fuel level signal carried by the wires 30 to the fuel level indicator (not shown). The length of the wiper arm 38 is dictated by the shape or depth of the tank 12. That is, the wiper arm 38 must be long enough to allow the float to float upon the surface of fuel between a minimum and maximum elevation (i.e. Empty to full fuel tank conditions).

The variable resistor 32 has a series of contacts 48 imprinted upon the circuit board or card 34 and generally arranged side-by-side forming a semi-circular or arcuate orientation to preferably coincide with the pivoting axis of the wiper arm 38. Preferably the card 34 has a ceramic substance. The resistor 32 is connected electrically to one of the two wires 30. The second wire is electrically connected to a semi-circular or arcuate contact 50 also imprinted upon the card 34 and preferably coinciding with the pivot axis. The contact 50 is spaced radially from the resistor 32 and the series of contacts 48 and extends circumferentially with the series of contacts 48 so that the electrical contacts 46 mounted on the bottom side of a non-conductive or plastic saddle 52, attached to the base end 40 of the wiper arm 38, engage and electrically bridge or connect the neutral contact 50 with a predetermined one, or a few, of the series of contacts 48 as the wiper arm 38 is swept across the card 34 by the remote buoyant float 44 responding to the varying fuel level.

The electrical resistance of variable resister 32 changes electrical resistance by mechanical movement of the wiper arm attached to the distal float 44 that is responsive to changes in fuel level in the fuel tank 12. The contacts 46 of the saddle 52 are adapted for contacting specific contacts 48 of the variable resistor 32 electrically bridging across to the neutral contact 50 as the saddle 52 and arm 38 sweep there across to complete the variable resistor circuit.

As the level of fuel within the fuel tank 12 changes, the float 44 and wiper arm 38 move and thereby cause the saddle 52 to slide over the arcuate resistive contacts to change an effective length of the variable resistor 32 between the terminals and thereby vary the effective resistance of the variable resistor 32. In accordance with the change in resistance, the current or voltage across the resistor card changes and, thus, effects a change—such as from "Full" toward "Empty"—in a remote fuel level indicator (not shown).

In use, resistive areas and conductive contacts 48 of the variable resistor 32 are generally exposed to the harsh fuel environment in the fuel tank 12. Heptane fuels and especially those containing alcohol supplements can erode the resistive areas and conductive contacts 48, 50 causing sporadic or noisy fuel level indication/measurement. Expensive manufacturing techniques such as the application of coating to the resistor assembly and special housings must be applied to limit erosion. Moreover, existing fuel level sensors can perform erratically when a wiper contactor 46 falls in between, and momentarily out of contact with adjacent, and worn, contacts 48 of the variable resistor 32. In other words, a portion of the variable resistor is momentarily opened or interrupted, thereby causing voltage or current spikes to be output from the fuel level sensor to a liquid level indicator. This problem increasingly occurs as the conductive contacts 48 and edges of the wiper contactors 46 wear out. Another problem involves "catching" of wiper contactor corners on angled conductive contacts 48. When a saddle 52 sweeps across the resistive contacts 48, the sharp corners of the contactors can "catch" on the angled conductive contacts 48, thereby causing noisy operation of the variable resistor 32.

SUMMARY OF THE INVENTION

A fuel level measurement device has a fuel level sensor integrated into a fuel level float at the distal end of a pivoting float arm of the device which is preferably part of a fuel pump module located inside of a fuel tank preferably for automotive applications. A sealed arcuate chamber of the float is defined between a preferred or electrically conductive cover and a generally non-conductive ceramic substrate that carries an electrically, variable, resistive ink strip. A track exposed in the arcuate chamber has a concave shape that generally faces upward so that a rolling member changes position due to the forces of gravity within the chamber as the float arm pivots generally up and down with changing fuel levels in the tank. The rolling member is electrically conductive and completes the circuit between the electrically conductive cover and the variable resistive ink strip. The sealed chamber provides the pathway for the rolling member and preferably at least in part the buoyancy of the float.

Objects, features and advantages of this invention include a resistive card or resistive ink strip that is isolated from the corrosive effects of the fuel by being sealed within a float of the fuel level measurement device. The arcuate float chamber preferably provides the dual function of containing the wiper or rolling member and providing the float-like fuel level sensor with buoyancy, and thus simplifying the design, reducing the number of parts required, and reducing manufacturing costs. Other advantages include a robust design that has a long and useful life.

BRIEF DESCRIPTION OF THE DRAWINGS

These and other objects, features and advantages of the present invention will be apparent from the following detailed description of the preferred embodiment and best mode, appended claims, and accompanying drawings in which:

DETAILED DESCRIPTION OF THE PREFERRED EMBODIMENTS

Figure 1:
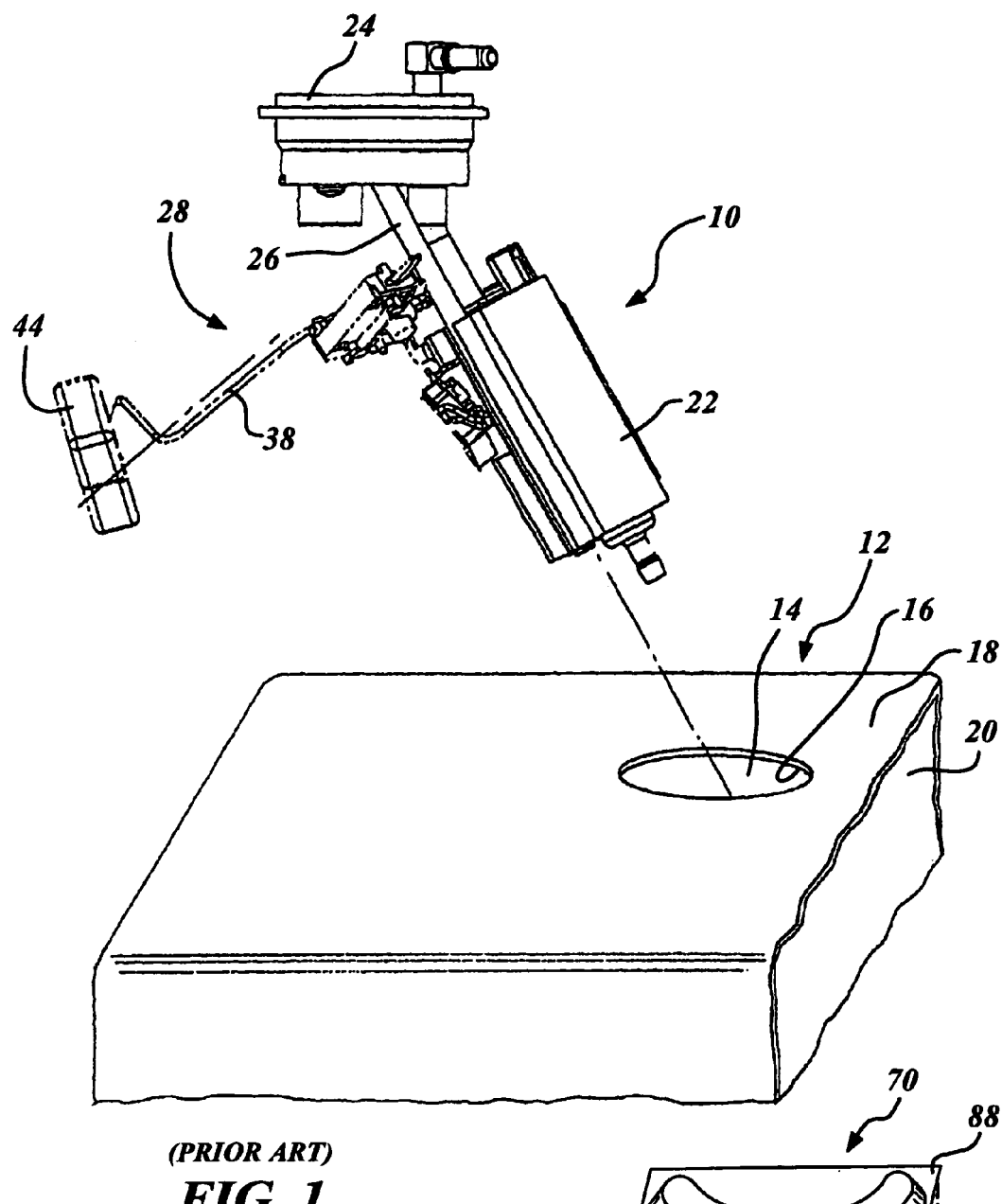
FIG. 1 is a perspective view of a prior art fuel pump module having a fuel level measurement device.
Figure 4:
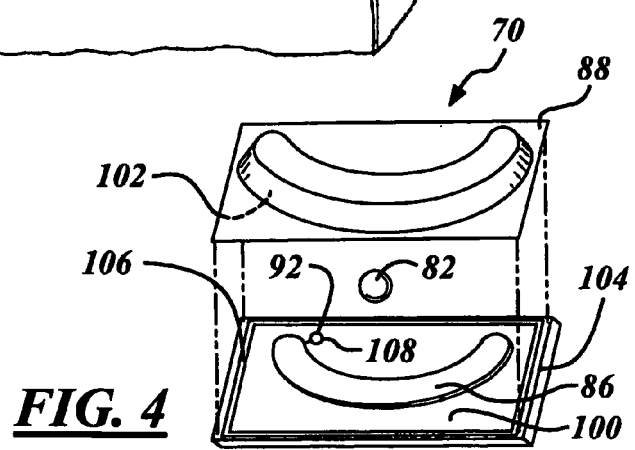
FIG. 4 is an exploded perspective view of a float fuel level sensor of the fuel level measurement device.
Figure 2:
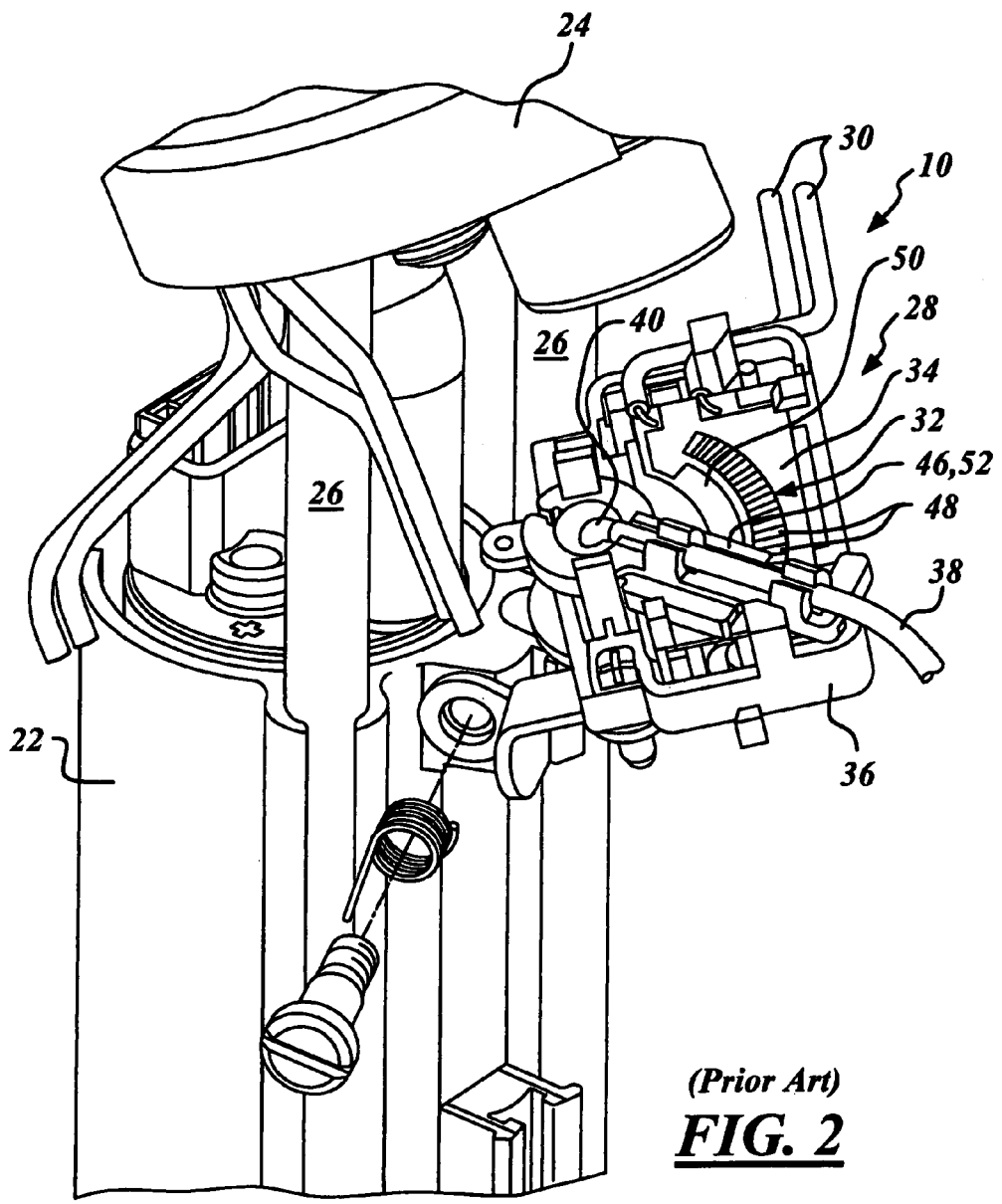
FIG. 2 is a partial enlarged perspective view of the prior art fuel pump module of FIG. 1 illustrating a fuel level sensor mechanism.

Referring to FIGS. 3-7, a fuel level measurement device 60 generally disposed in a fuel tank 62 of the present invention preferably has an elongated actuator arm 64 attached pivotally at a base end 66 to a generally stationary structure 68 and attached to a buoyant fuel level sensor 70 at an opposite distal end 72. The stationary structure is preferably a fuel pump module similar to that disclosed in U.S. Pat. No. 6,761,193 B1, dated Jul. 13, 2004, assigned to Walbro Engine Management, and incorporated herein in its entirety. The fuel level sensor 70 functions in part as a float having a sealed chamber 74 defined by a float housing 76 attached rigidly to the pivoting arm 64. The arm 64, provides or maintains a reference position or angular relationship between the buoyant fuel level sensor and the fuel level. In-other-words, the angular position (as indicated by arrow 78 of FIG. 6) of the fuel level sensor 70 in reference to the fuel surface 80 or an imaginary plane parallel to the surface 80 of the fuel dictates fuel level indication.

The fuel level sensor 70 has a gravity sensitive and electrically conductive member 82 disposed in the chamber 74. The housing 76 has a generally arcuate-shape or contour forming an internal concave track 84 that the conductive member 82 rides upon while seeking its lowest elevation along the track length and as the arm 64 pivots and the vertical position of the buoyant fuel level sensor 70 changes with changing fuel levels. Preferably, the electrically conductive member 82 is a metallic ball, however, it can be any shape which will ultimately seek a low elevation due to the forces of gravity and that is electrically conductive. Other alternatives include cylindrical shapes, or liquid metals which are conductive such as mercury.

Figure 7:
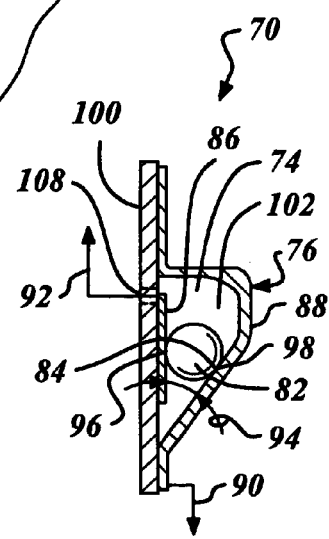
FIG. 7 is a cross section of the fuel level sensor taken along line 7-7 of FIG. 5.

The conductive member 82 or ball completes a circuit between a variable resistive ink strip 86 and a continuous electrically conductive ground or neutral conductor or portion 88 of the housing 76. A first electrical lead 90 or wire is connected to the conductive ground portion 88 of the housing 76 and a second electrical lead or signal wire 92 is connected to the resistive ink strip 86 for providing a variable voltage or current signal to a remote fuel level indicator (not shown). As best shown in FIG. 7, lateral cross section of the track has a substantially acute included angle, identified as arrow 94, so that the conductive ball 82 at two points 96, 98 continuously contacts and rides upon the track 84. At the first contact point 96 the ball 82 rides upon the resistive ink strip 86 and at the second contact point 98 it rides upon the ground portion 88 of the housing 76. The weight of the ball 82 itself not only causes the ball to seek the lowest elevation along the track 84 but also to remain in substantially continuous contact with both the resistive ink strip 86 and the ground portion 88 of the housing 76.

Forms of the variable resistive ink strip 86 are taught in SAE Technical Paper Series 2002-01-1074, titled "Design Guidelines for Automotive Fuel Level Sensors, by E. F. Smith, dated Mar. 4-7, 2002, and incorporated herein by reference in its entirety. For ease of manufacturing, the resistive ink strip 86 is adhered to a substantially planar and non-conductive portion 100 of the housing 76 which preferably is made of a ceramic substrate. The resistive ink strip 86, upon which the first contact point 96 of the conductive ball 82 rides, is substantially vertical and forms an arc that is generally concave in the upward direction. The actual contour of the arcuate chamber 74 or channel is generally formed by the conductive ground portion 88 of the housing 76 that is preferably a metallic cover easily contoured or stamped during manufacture. When viewed separately, the cover 88 defines an arcuate groove 102 which opens laterally toward the ceramic substrate 100 and directly across from the ink strip 86.

An outer perimeter 104 of the ceramic substrate 100 carries a solder trace 106 for hermetically sealing with the cover 88 by a soldering process. Similarly a hole 108 in the ceramic substrate 100 provides an electrical pathway for connection of the signal wire 92 to the resistive ink strip 86 and is also hermetically sealed by a soldering process.

Figure 5:
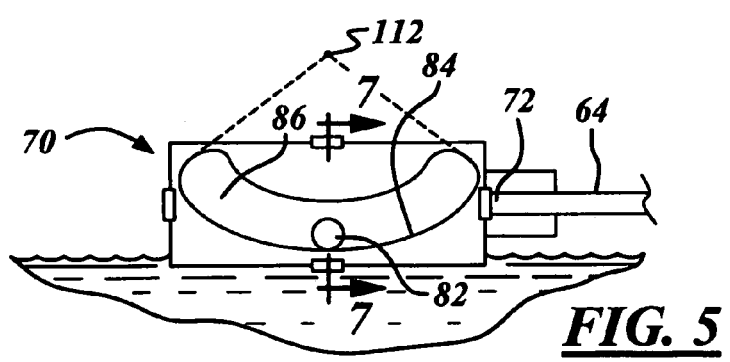
FIG. 5 is a front view of the fuel level sensor in a relatively high fuel level position and with a cover removed to show internal detail.
Figure 3:
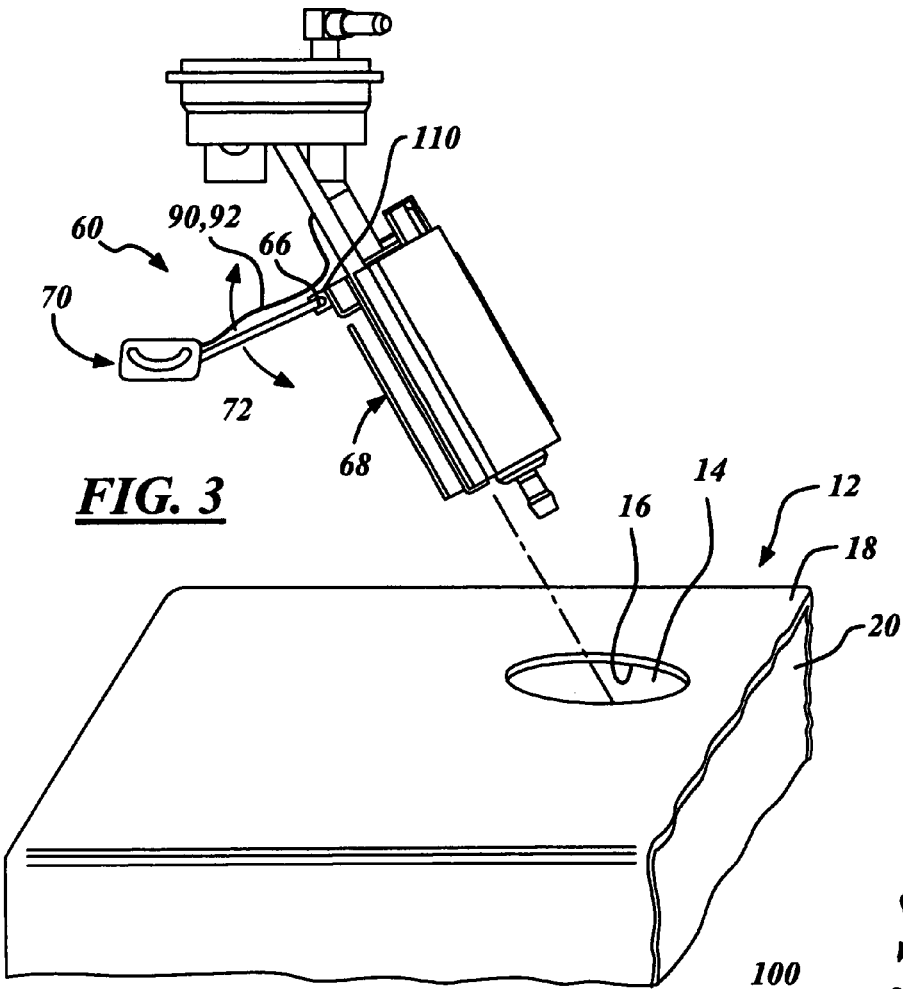
FIG. 3 is a perspective view of a fuel pump module having a fuel level measurement device of the present invention.
Figure 6:
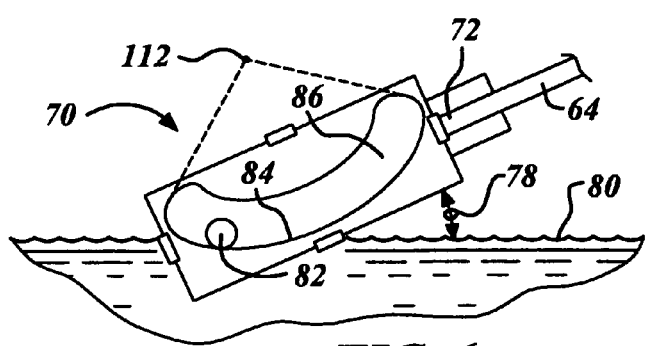
FIG. 6 is a front view of the fuel level sensor in a relatively low fuel level position and with the cover removed to show internal detail.

In operation, and as illustrated in FIGS. 5 and 6, the carrier arm 64 is preferably designed to pivot about a pivot axis 110 through an angular range of about sixty to ninety degrees from a generally full fuel level (not shown), through a half full fuel tank level as illustrated in FIG. 5, to a low or near empty fuel tank level as generally shown in FIG. 6. The fuel level sensor or float 70 thus is designed to move circumferentially about the pivot point or axis 110 through an angular range of about sixty to ninety degrees and preferably about seventy five to ninety degrees. Similarly, the curvature of the tract 84 is substantially arcuate and preferably has a substantially constant radius from a centerline 112. The pivot axis 110 and centerline 112 are preferably substantially parallel to one-another and spaced apart by the actuating arm 64. Thus as the float or fuel level sensor 70 moves circumferentially about the pivot point 110, the ball 82 also moves circumferentially about the centerline 112 at the same desirable angular range of about sixty to ninety degrees and preferably seventy five to ninety five degrees.

While the forms of the invention herein disclosed constitute a presently preferred embodiment, many others are possible. For instance, although the ground conductor or neutral portion 88 of the housing 76 is preferably unitary to the housing, thus reducing the number of parts, the conductor 88 can be a plating or a strip adhered to the remainder of the housing. It is not intended herein to mention all the possible equivalent forms or ramifications of the invention. It is understood that terms used herein are merely descriptive, rather than limiting, and that various changes may be made without departing from the spirit and scope of the invention as defined by the following claims.

What is claimed is:

1. A fuel level measurement device for a fuel tank comprising:
    an arm having one end configured to be carried pivotally by a body and a distal end;
    a float housing carried by the arm adjacent the distal end and defining a sealed chamber providing buoyancy generally upon a surface of fuel in the tank;
    a cupped track carried by the housing within the chamber and opening generally upward;
    a gravity responsive, electrically conductive, member that changes position along the track with changing elevation of the float housing;
    an electrical conductor exposed in the chamber and extending along the length of the track;
    a variable electrically resistive ink strip exposed in the chamber and extending along the length of the track; and
    the gravity responsive member is in movable electrical contact with the resistive ink strip at a first point and in movable electrical contact with the electrical conductor at a second point to provide an electrically conductive path generally of the member and between the ink strip and the conductor for electrical circuit completion.

2. The fuel level measurement device set forth in claim 1 wherein the electrical conductor is a metallic cover.

3. The fuel level measurement device set forth in claim 2 further comprising a non-conductive substrate of the housing engaged sealably to the cover along a perimeter, defining in part the chamber and carrying the variable electrically resistive ink strip exposed in the chamber.

4. The fuel level measurement device set forth in claim 3 wherein the gravity responsive member is a metallic ball disposed between the resistive ink strip and the metallic cover.

5. The fuel level measurement device set forth in claim 1 wherein the body is a fuel pump module located inside a fuel tank.

6. The fuel level measurement device set forth in claim 3 wherein the non-conductive substrate is a ceramic substrate.

7. The fuel level measurement device set forth in claim 6 wherein the cover is sealably soldered to the ceramic substrate along the perimeter of the cover.

8. The fuel level measurement device set forth in claim 6 further comprising a continuous solder trace of the ceramic substrate disposed along the perimeter of the cover for soldering the cover to the substrate.

9. The fuel level measurement device set forth in claim 6 further comprising a signal wire connected electrically to the resistive ink strip and extending through a hermetically sealed hole of the substrate.

10. The fuel level measurement device set forth in claim 6 wherein the ceramic substrate is substantially planar and the cover is contoured.

11. The fuel level measurement device set forth in claim 10 further comprising a concave track carried by the cover and the ceramic substrate, and substantially facing upward toward the top of the fuel tank.

12. The fuel level measurement device set forth in claim 1 wherein the first contact point is singular and is the only contact point between the variable resistive ink strip and the gravity responsive electrically conductive member.

13. A fuel level measurement device of a fuel pump module configured to be located in a fuel tank, the fuel level measurement device comprising:
    a float that rotates about an axis of rotation with varying fuel level, the float having a housing defining a sealed chamber;
    an electrically variable resistive ink strip carried by the housing and exposed in the chamber;
    an electrically conductive portion of the housing substantially confronting the resistive ink strip; and
    a conductive member constructed and arranged to maintain a low point by gravity with rotation of the float, the conductive member contacting the resistive ink strip at a movable first point and riding along the resistive ink strip as the float moves arcuately about an imaginary centerline with varying fuel level, and contacting the electrically conductive portion at a movable second point.

14. The fuel level measurement device set forth in claim 13 further comprising an arm pivotally carried by the fuel pump module and projecting longitudinally outward and attached to the housing to move in unison with the housing.

15. The fuel level measurement device set forth in claim 13 wherein the conductive member is a metallic ball.

16. The fuel level measurement device set forth in claim 13 wherein the resistive ink strip is carried by a ceramic substrate of the housing.

17. The fuel level measurement device set forth in claim 16 wherein the electrically conductive portion of the housing is a metallic cover hermetically sealed along a perimeter to the ceramic substrate.

* * * * *